(12) United States Patent
Akcayoz

(10) Patent No.: US 11,808,207 B1
(45) Date of Patent: Nov. 7, 2023

(54) AIRCRAFT INTAKE DUCT WITH ACTIVELY MOVABLE FLOW RESTRICTOR

(71) Applicant: PRATT & WHITNEY CANADA CORP., Longueuil (CA)

(72) Inventor: Eray Akcayoz, Cote-Saint-Luc (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/817,758

(22) Filed: Aug. 5, 2022

(51) Int. Cl.
    *F02C 7/057* (2006.01)
    *F01D 17/08* (2006.01)
    *F01D 17/14* (2006.01)
    *F02C 7/042* (2006.01)

(52) U.S. Cl.
    CPC .............. *F02C 7/057* (2013.01); *F01D 17/08* (2013.01); *F01D 17/141* (2013.01); *F02C 7/042* (2013.01); *F05D 2270/3015* (2013.01)

(58) Field of Classification Search
    CPC .......... F02C 7/057; F02C 7/042; B64C 33/02; B64D 2033/0293; B64D 2033/0286; F01D 17/08; F01D 17/14; F01D 17/141; F01D 17/146; F05D 2270/3015
    See application file for complete search history.

(56) References Cited

U.S. PATENT DOCUMENTS

| | | | |
|---|---|---|---|
| 5,725,180 A * | 3/1998 | Chamay | F02C 7/04 244/53 B |
| 6,959,552 B2 | 11/2005 | Leblanc | |
| 9,217,369 B2 | 12/2015 | Rodriguez | |
| 2020/0208651 A1* | 7/2020 | Bogner | F04D 27/0253 |
| 2020/0208652 A1* | 7/2020 | Bogner | F02B 33/40 |

FOREIGN PATENT DOCUMENTS

DE      102015209704 A1 * 8/2014 ........... F01D 17/141

OTHER PUBLICATIONS

English machine translation of DE-102015209704-A1, Mar. 11, 2023.*

* cited by examiner

*Primary Examiner* — Christopher Verdier
(74) *Attorney, Agent, or Firm* — NORTON ROSE FULBRIGHT CANADA LLP.

(57) ABSTRACT

An aircraft engine, has: an inlet extending circumferentially around a central axis; an annular inlet duct having a duct inlet fluidly connected to an environment outside of the aircraft engine and a duct outlet fluidly connected to the inlet; a flow restrictor extending across the annular inlet duct and being movable within the annular inlet duct; an actuator engaged to the flow restrictor and operable to move the flow restrictor; and a controller operatively connected to at least one sensor and the actuator, the controller having a processing unit and a computer-readable medium operatively connected to the processing unit and containing instructions for: receiving a signal indicative of a pressure difference between opposite sides of the flow restrictor; and powering the actuator to move the flow restrictor with the actuator from a first position to a second position offset from the first position as a function of the pressure difference.

19 Claims, 7 Drawing Sheets

AIRCRAFT INTAKE DUCT WITH ACTIVELY MOVABLE FLOW RESTRICTOR

TECHNICAL FIELD

The application relates generally to aircraft engines and, more particularly, to inlets of compressor sections of such engines.

BACKGROUND

Some aircraft engines have an annular air inlet duct to distribute an incoming flow of air circumferentially around an inlet. Flow within this annular air inlet duct may be affected by operating conditions, such as, for instance, Mach number, sideslip angle, engine mass flow rate, and so on. Thus, improvements in this annular inlet duct are sought.

SUMMARY

In one aspect, there is provided an aircraft engine, comprising: an inlet leading to a compressor section, the inlet extending circumferentially around a central axis; an annular inlet duct extending circumferentially around the central axis, the annular inlet duct having a duct inlet fluidly connected to an environment outside of the aircraft engine and a duct outlet fluidly connected to the inlet, the duct outlet extending circumferentially around the central axis; a flow restrictor located within the annular inlet duct, the flow restrictor extending across the annular inlet duct and being movable within the annular inlet duct along a circumferential direction relative to the central axis; an actuator engaged to the flow restrictor, the actuator operable to move the flow restrictor along the circumferential direction; and a controller operatively connected to at least one sensor and the actuator, the controller having a processing unit and a computer-readable medium operatively connected to the processing unit and containing instructions executable by the processing unit for: receiving a signal from the at least one sensor, the signal indicative of a pressure difference between opposite sides of the flow restrictor; and powering the actuator to move the flow restrictor with the actuator from a first position to a second position circumferentially offset form the first position as a function of the pressure difference.

The aircraft engine may include any of the following features, in any combinations.

In some embodiments, the receiving of the signal from the at least one sensor includes receiving the signal indicative of the pressure difference being different than zero.

In some embodiments, the at least one sensor includes two sensors each operatively connected to a respective one of two sections of the annular inlet duct, the two sections opposite one another and extending from the duct inlet to the flow restrictor.

In some embodiments, the two sensors are pressure sensors each operable to measure a respective pressure within the respective one of the two sections.

In some embodiments, the two sensors are disposed at or proximate the duct inlet and circumferentially offset from one another.

In some embodiments, the two sensors are disposed each on a respective one of the opposite sides of the flow restrictor and move with the flow restrictor.

In some embodiments, the flow restrictor is movable by 45 degrees in both clockwise and counter clockwise directions from a baseline position being diametrically opposed to the duct inlet and intersecting a centerline of the annular inlet duct, the centerline intersecting the central axis.

In some embodiments, the annular inlet duct includes an outer wall and two side walls extending from the outer wall, the flow restrictor located between the two side walls and movably engaged to the outer wall.

In some embodiments, the flow restrictor is engaged on rails secured to the outer wall.

In some embodiments, blockers are secured to the annular inlet duct to limit an amplitude of movements of the flow restrictor.

In another aspect, there is provided an intake for an aircraft engine, comprising: an annular inlet duct extending circumferentially around a central axis, the annular inlet duct having an duct inlet fluidly connected to an environment outside of the aircraft engine and a duct outlet extending circumferentially around the central axis, the annular inlet duct defining: a first section extending from the duct inlet towards a location being diametrically opposed to the duct inlet, and a second section extending from the duct inlet towards the location, the second section opposite the first section; a flow restrictor located within the annular inlet duct, the flow restrictor extending across the annular inlet duct and being movable within the annular inlet duct along a circumferential direction relative to the central axis; and an actuator engaged to the flow restrictor, the actuator operable to move the flow restriction along the circumferential direction.

The intake may include any of the following features, in any combinations.

In some embodiments, a controller is operatively connected to at least one sensor and the actuator, the controller having a processing unit and a computer-readable medium operatively connected to the processing unit and containing instructions executable by the processing unit for: receiving a signal from the at least one sensor, the signal indicative of a pressure difference between a first pressure within the first section and a second pressure within the second section; and powering the actuator to move the flow restrictor with the actuator from a first position to a second position circumferentially offset from the first position as a function of the pressure difference.

In some embodiments, the receiving of the signal from the at least one sensor includes receiving the signal indicative of the pressure difference being different than zero.

In some embodiments, the at least one sensor includes two sensors each operatively connected to a respective one the first section and the second section.

In some embodiments, the two sensors are pressure sensors each operable to measure a respective pressure within the respective one of the first section and the second section.

In some embodiments, the two sensors are disposed at or proximate the duct inlet and circumferentially offset from one another.

In some embodiments, the two sensors are disposed each on a respective one of the opposite sides of the flow restrictor and move with the flow restrictor.

In some embodiments, the flow restrictor is movable by 45 degrees in both clockwise and counter clockwise directions from a baseline position being diametrically opposed to the duct inlet and intersecting a centerline of the annular inlet duct, the centerline intersecting the central axis.

In some embodiments, the annular inlet duct includes an outer wall and two side walls extending from the outer wall, the flow restrictor located between the two side walls and movably engaged to the outer wall.

In some embodiments, the flow restrictor is engaged on rails secured to the outer wall.

BRIEF DESCRIPTION OF THE DRAWINGS

Reference is now made to the accompanying figures in which.

DETAILED DESCRIPTION

Figure 1:
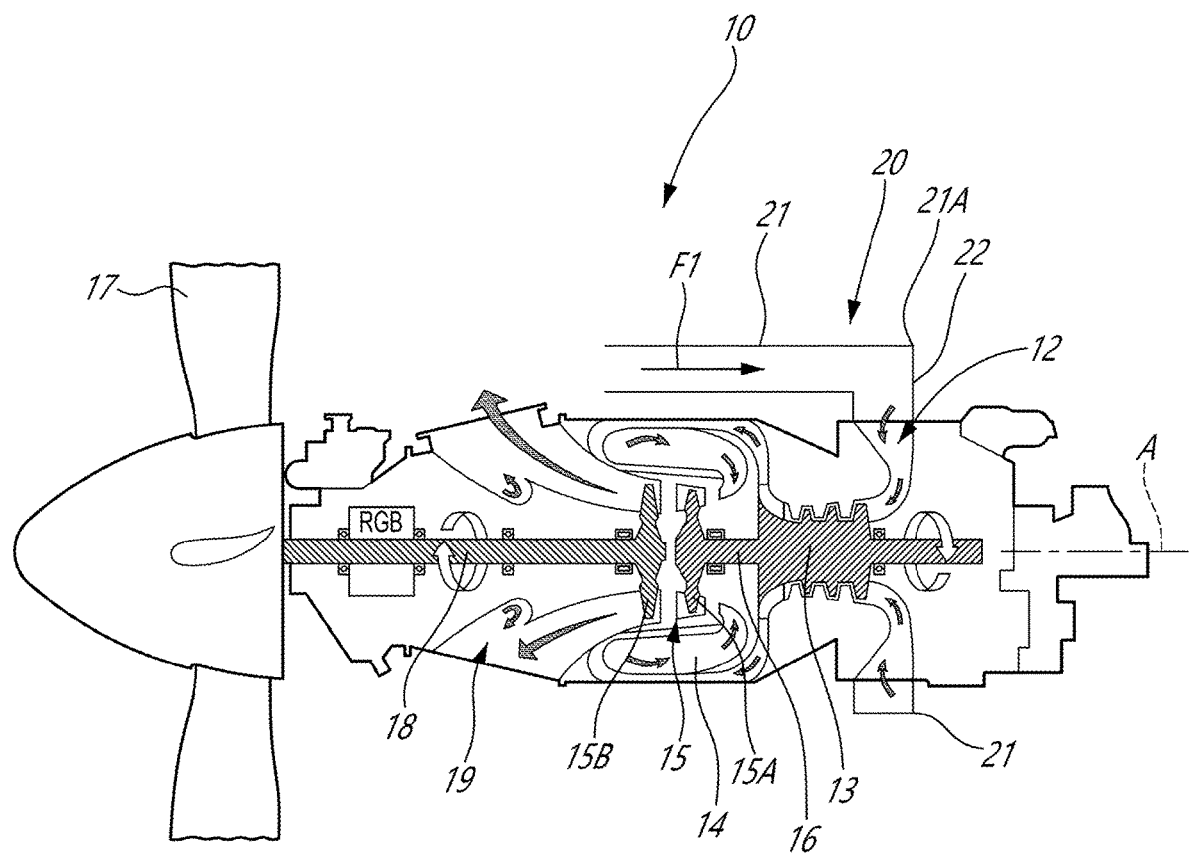
FIG. 1 is a schematic cross sectional view of an aircraft engine exemplified as a gas turbine engine.

FIG. 1 illustrates an aircraft engine depicted as a gas turbine engine 10 of a type preferably provided for use in subsonic flight, generally comprising in serial flow communication an inlet 12 for receiving air, a compressor section 13 for compressing the air received via the inlet 12, a combustor 14 for mixing fuel with the compressed air and for generating an annular stream of combustion gases. A turbine section 15 receiving the combustion gases from the combustor 14. The turbine section 15 has a high-pressure turbine 15A drivingly engaged to the compressor section 13 via a high-pressure shaft 16. The turbine section 15 further has a power or low-pressure turbine 15B downstream of the high-pressure turbine 15A and drivingly engaged to a propeller 17 via a low-pressure shaft 18. The low-pressure shaft 18 may be directly engaged to the propeller 17 or, as shown herein, drivingly engaged to the propeller 17 via a reduction gearbox RGB. The gas turbine engine 10 has an exhaust 19 for expelling the combustion gases. Although the depicted gas turbine engine 10 is a turboprop engine, the present disclosure may apply to other engines, such as turboshaft engines and to auxiliary power units (APU). In an alternate embodiment, the compressor section may include a high-pressure compressor drivingly engaged to the high-pressure turbine 15A via the high-pressure shaft 16 and a low-pressure compressor drivingly engaged to the low-pressure turbine 15B via the low-pressure shaft 18.

In the embodiment shown, the inlet 12 of the gas turbine engine 10 is fluidly connected to an intake 20. The intake 20 is used to receive air from an environment and to direct this air towards the inlet 12. The intake 20 includes a duct 21 that receives ambient air and that leads to an annular inlet duct 22 that extends circumferentially around the inlet 12 and around a central axis A of the gas turbine engine 10. The annular inlet duct 22 is therefore used to circumferentially distribute air, which is received at a given circumferential position via the duct 21, around the inlet 12 to feed the compressor section 13. The duct 21 may define an elbow 21A to redirect an incoming flow F1 from a substantially axial direction to a substantially radial direction relative to the central axis A. Herein, the expression "substantially" implies that variations between a purely axial (or radial) direction is possible as long as a main component of the direction of the flow is in the axial (or radial) direction. The intake 20 therefore receives air in a direction being substantially axial relative to the central axis A and redirects this air in a circumferential direction around the central axis A and in a radially-inward direction to feed the inlet 12 of the gas turbine engine 10.

Figure 2:
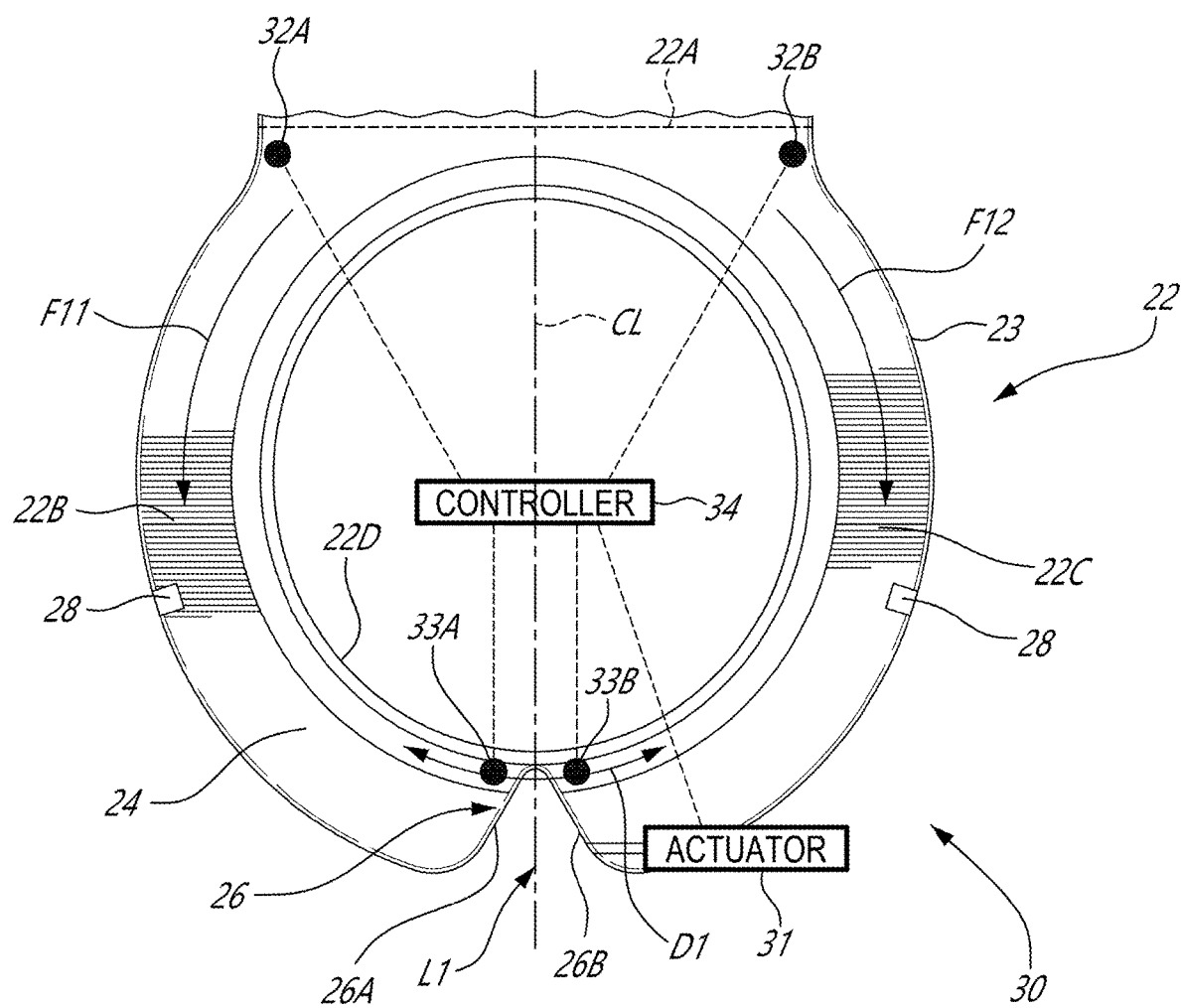
FIG. 2 is a front view of an intake of the aircraft engine of FIG. 1.

Referring now to FIG. 2, the annular inlet duct 22 is shown in greater detail and includes a duct inlet 22A (shown with a dashed line) that is connected to the duct 21 (FIG. 1) for receiving ambient air. The annular inlet duct 22 further includes a first section 22B extending circumferentially relative to the central axis A from the duct inlet 22A to a location L1 opposite the duct inlet 22A, and a second section 22C extending circumferentially relative to the central axis A from the duct inlet 22A to the location L1 opposite the duct inlet 22A. The first section 22B and the second section 22C are located on opposite sides of a centerline CL of the annular inlet duct 22. The centerline CL is normal to the central axis A and intersects the location L1. The location L1 may therefore be diametrically opposed to the duct inlet 22A.

Figure 3:
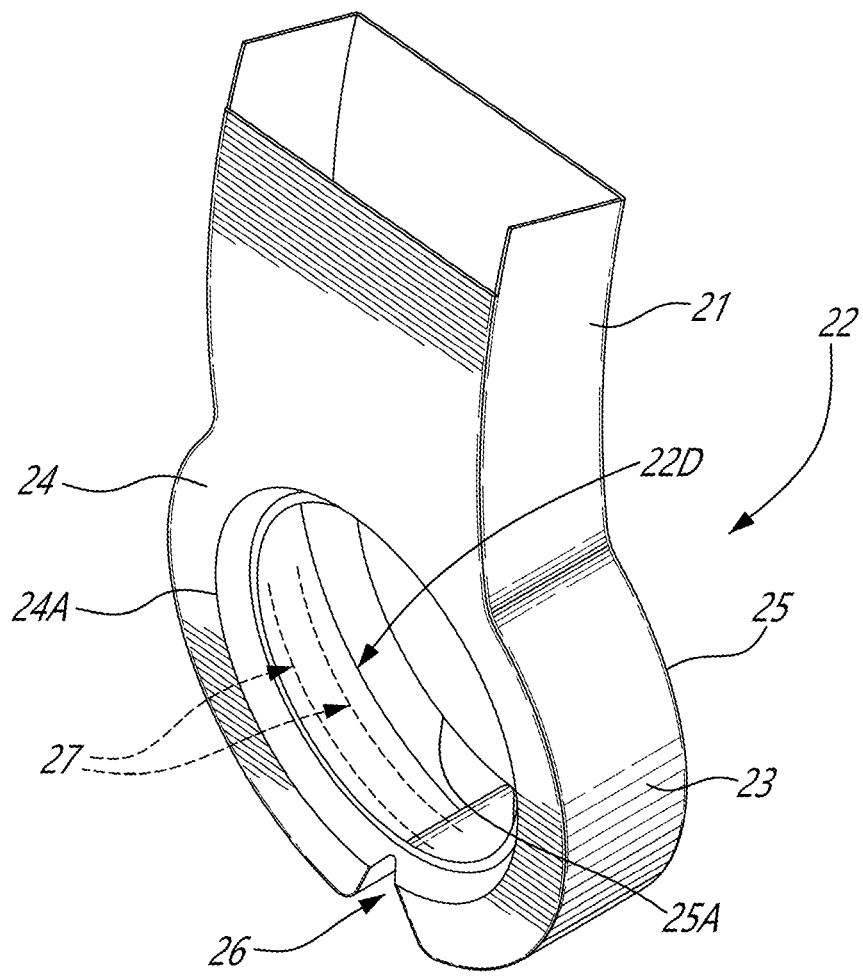
FIG. 3 is a three dimensional view of the intake of FIG. 2.

Referring to FIGS. 2-3, the annular inlet duct 22 includes an outer wall 23, a first side wall 24 secured to the outer wall 23 and extending towards the central axis A in a direction having a radial component relative to the central axis A, and a second side wall 25 opposite the first side wall 24, secured to the outer wall 23, and extending towards the central axis A along a direction having a radial component relative to the central axis A. The first side wall 24 may be parallel to the second side wall 25. Other configurations are contemplated. The annular inlet duct 22 has a duct outlet 22D leading to the inlet 12 of the gas turbine engine 10 and the compressor section 13. The duct outlet 22D is defined axially between the first side wall 24 and the second side wall 25. More specifically, the duct outlet 22D may extend annularly around the central axis A. The duct outlet 22D may extend a full circumference around the central axis A. The duct outlet 22D may be defined axially between an inner edge 24A of the first side wall 24 and an inner edge 25A of the second side wall 25. The duct outlet 22D may therefore be considered as a gap or spacing defined between the first side wall 24 and the second side wall 25.

A flow restrictor 26, also referred to as a "ski-jump", is located within the annular inlet duct 22 and may intersect the location L1 and the centerline CL. This flow restrictor 26 is used to limit ambient air received via the duct inlet 22A from flowing from the first section 22B to the second section 22C and vice-versa. Put differently, the flow restrictor 26 may fluidly separate the first section 22B from the second section 22C. To this end, the flow restrictor 26 extends across the annular inlet duct 22. In the present case, the flow restrictor 26 extends in a direction having a radial component relative to the central axis A. The flow restrictor 26 may extend radially up to the inner edges 24A, 25A of the first and second side walls 24, 25. The flow restrictor 26 may be substantially air tight. That is, the flow restrictor 26 may include a body being non-permeable to air. In some cases, the flow restrictor 26 may permit some air to flow there through. More than one flow restrictor 26 may also be used and circumferentially distributed to achieve the desired flow distribution or flow bias. The flow restrictor 26 has herein a triangular shape, but any other suitable shapes are contemplated.

In some cases, the positioning of the flow restrictor 26 on the centerline CL may affect performance of the compressor section 13 because the air flow within the annular inlet duct 22 may be non-uniform due to asymmetry in the duct 21 or due to changes in aircraft Mach number, sideslip angle, and/or engine mass flow rates, for example. Non-uniformity of air flow may result in increased total pressure losses and/or air flow distortion. This may affect performance of the compressor section 13 and of downstream components.

In the embodiment shown, the flow restrictor 26 is movable along a circumferential direction D1 (FIG. 2) relative to the central axis A and within the annular inlet duct 22. The flow restrictor 26 is movably engaged to the outer wall 23, to the first side wall 24, and/or to the second side wall 25. In the present embodiment, the flow restrictor 26 is movably engaged to the outer wall 23 via at least one rail, two rails 27 (FIG. 3) in the embodiment shown. The two rails 27 are affixed to the outer all 23. Bearings or other means may be used to assist movement of the flow restrictor 26 in the circumferential direction D1 relative to the central axis A. More or less than two rails may be used. Any means allowing the movements of the flow restrictor 26 are contemplated.

In the present embodiment, the flow restrictor 26 has a first face 26A and a second face 26B opposed to the first face 26A. The first face 26A and the second face 26B are herein shown as being non-parallel to one another and converging towards one another towards the central axis A. Alternatively, the first face 26A and the second face 26B may be parallel to one another.

The flow restrictor 26 may be movable by 45 degrees in both clockwise and counter clockwise directions from a baseline position being diametrically opposed to the duct inlet 22A. The flow restrictor 26 may be constrained at other angles (e.g., 30 degrees, 90 degrees). The baseline position may correspond to the location L1 described above. The baseline position corresponds to a position of the flow restrictor 26 if pressure within the first section 22B equals the pressure in the second section 22C. Blockers 28 may be secured to the annular inlet duct 22, for instance, to any of the outer wall 23, the first side wall 24, and/or the second side wall 25, to limit movements of the flow restrictor 26. These blockers 28 may be protrusions or any kind of body secured to the annular inlet duct 22 to impede further movements of the flow restrictor 26.

Referring to FIG. 2, in the embodiment shown, a control system 30 is operatively connected to the annular inlet duct 22. The control system 30 is operable to determine characteristics of the flow received via the duct inlet 22A and to adjust a position of the flow restrictor 26 as a function of those characteristics. The control system 30 includes an actuator 31 engaged to the flow restrictor 26. The actuator 31 may be a linear actuator (e.g., hydraulic actuator, pneumatic actuator, etc). The actuator 31 may alternatively include a pinion gear engaged to a motor (e.g., electric motor) and a rack gear meshed with the pinion gear and engaged to one of the walls of the annular inlet duct 22; the pinon gear and the motor being mounted on the flow restrictor 26. Any suitable means of moving the flow restrictor 26 are contemplated without departing from the scope of the present disclosure.

The first face 26A of the flow restrictor 26 is exposed to a first pressure of air located within the first section 22B of the annular inlet duct 22 while the second face 26B is exposed to a second pressure of air located within the second section 22C of the annular inlet duct 22. In some cases, the first pressure may be different (e.g., greater, less) than the second pressure.

The control system 30 further includes at least one sensor, two first sensors 32A, 32B disposed proximate or at the duct inlet 22A. The two first sensors 32A, 32B may each be located on a respective side of the center line CL; one of the two first sensors 32A, 32B located proximate the first section 22B whereas the other of the two first sensors 32A, 32B is located proximate the second section 22C. In other words, the two first sensors 32A, 32B may be circumferentially offset from one another relative to the central axis A. Each of the two first sensors 32A, 32B may be in fluid communication with a respective one of the first section 22B and the second section 22C. The two first sensors 32A, 32B are spaced apart from another sufficiently to be able to measure variations within a pressure field of an air flow received via the duct inlet 22A. The two first sensors 32A, 32B may be secured to any of the walls of the annular inlet duct 22 and may be located such as to be exposed to air flowing within the annular inlet duct 22. The two first sensors 32A, 32B may be non-movable relative to the annular inlet duct 22. Two second sensors 33A, 33B may each be secured adjacent or on a respective one of the opposite faces 26A, 26B of the flow restrictor 26. These two second sensors 33A, 33B may thus be movable with the flow restrictor 26. These two second sensors 33A, 33B are each in fluid communication with a respective one of the first section 22B and the second section 22C of the annular inlet duct 22.

In some embodiments, only the two first sensors 32A, 32B or only the two second sensors 33A, 33B may be used. All of the two first sensors 32A, 32B and the two second sensors 33A, 33B may be used. The two first sensors 32A, 32B and the two second sensors 33A, 33B may be pressure sensors. However, any suitable sensors, such as temperature sensors, may alternatively be used. In some embodiments, the at least one sensor may be any sensors of an aircraft equipped with the gas turbine engine 10. For instance, a speed sensor sending a signal relating to an aircraft forward speed, a sensor indicative of the opening of an inlet bypass system, and/or a sensor indicative of an actual engine operating condition(s) may be used. Certain operating conditions may be swirl sensitive at certain operating point (e.g., co-rotating vs counter-rotating swirl). The angle between the axial and circumferential flow components at the compressor inlet plane is referred as swirl. The present disclosure may be used to control the flow swirl angle going into the compressor similar to inlet guide vanes (IGVs). A plenum generating flow turning in the same direction as the compressor (co-swirl) may increase the stall margin. A plenum generating flow turning in the opposite direction as the compressor (counter-swirl) may increase the pressure ratio across the compressor. The bypass is referring to bypass duct used in inlet ducts for ice/hail/FOD protection to protect the engine. In some applications, there is a door closing the bypass duct. The door could be closed based on pilot input or a sensor detecting the presence of ice. In such cases, the bypass door position may be used as an input to activate motion of the flow restrictor 26.

The at least one sensor is operable to send a signal indicative of a pressure difference between the opposite faces 26A, 26B of the flow restrictor 26 and/or indicative of a pressure difference between a first pressure within the first section 22B of the annular inlet duct 22 and a second pressure within the second section 22C of the annular inlet duct 22. The signal may be an actual pressure difference obtained from a difference between the pressures measured by the two first sensors 32A, 32B and/or from a difference between the pressures measured by the two second sensors 33A, 33B. Alternatively, the at least one sensor may generate a signal indicative that a pressure difference between the opposite faces 26A, 26B or between the first section 22B and the second section 22C is different than zero. For instance, the at least one sensor may send a signal indicative that the aircraft or gas turbine engine 10 is operated at certain operating conditions known to create an asymmetry in the flow entering the annular inlet duct 22 via the duct inlet 22A. This signal may be indicative of a sideslip angle, aircraft Mach number change, engine mass flow rates, etc. Any parameters indicative of the presence of an asymmetry at the duct inlet 22A may be used. The asymmetry may correspond to a non-uniform pressure field as described below.

Figure 4:
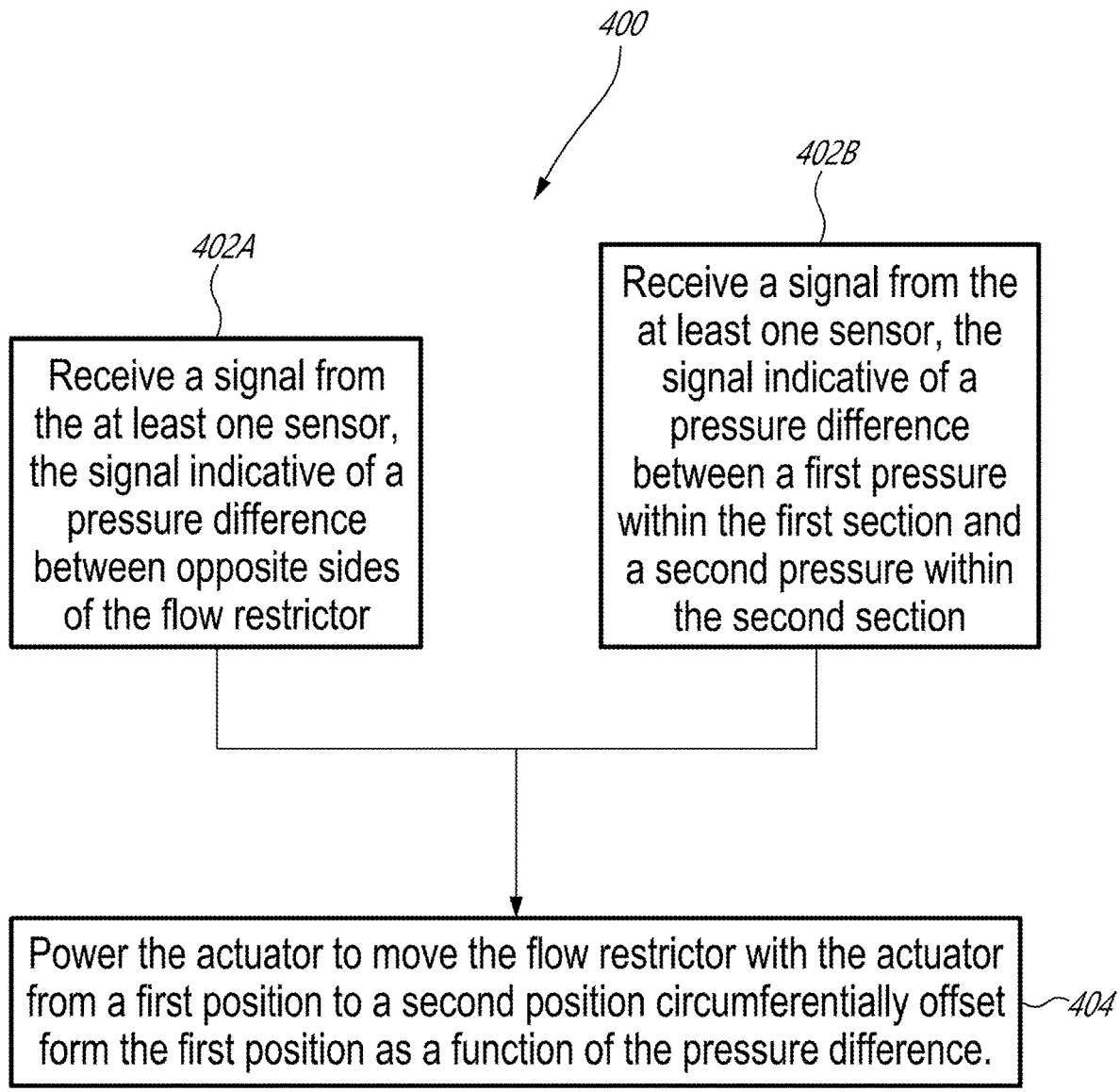
FIG. 4 is a flowchart illustrating steps of a method performed by a controller of a control system of the intake of FIG. 2.

Referring to FIGS. 2 and 4, the sensor(s) 32A, 32B, 33A, 33B and the actuator 31 are operatively connected to a controller 34. The controller 34 performs steps of a method 400 shown in FIG. 4. The method 400 includes receiving a signal from the at least one sensor, the signal indicative of a pressure difference between the opposite faces 26A, 26B of the flow restrictor 26 at 402A or, alternatively, receiving a signal from the at least one sensor, the signal indicative of a pressure difference between a first pressure within the first section 22B and a second pressure within the second section 22C at 402B. Then, the method 400 performed by the controller 34 includes powering the actuator 31 to move the flow restrictor 26 from a first position (depicted in FIG. 2) to a second position (depicted in FIG. 5 or 6) circumferentially offset from the first position as a function of the pressure difference. In some embodiments, the receiving of the signal from the at least one sensor includes receiving the signal indicative of the pressure difference being greater than zero.

In some embodiments, the flow restrictor 26 may be moved even if the pressure difference between the first and second pressures of the first and second sections, or if the pressure difference between the opposite sides of the flow restrictor 26, is zero. In other words, it may be desired to move the flow restrictor 26 from its baseline position at the location L1 even if the flow within the annular inlet duct 22 is symmetrical.

Figure 5:
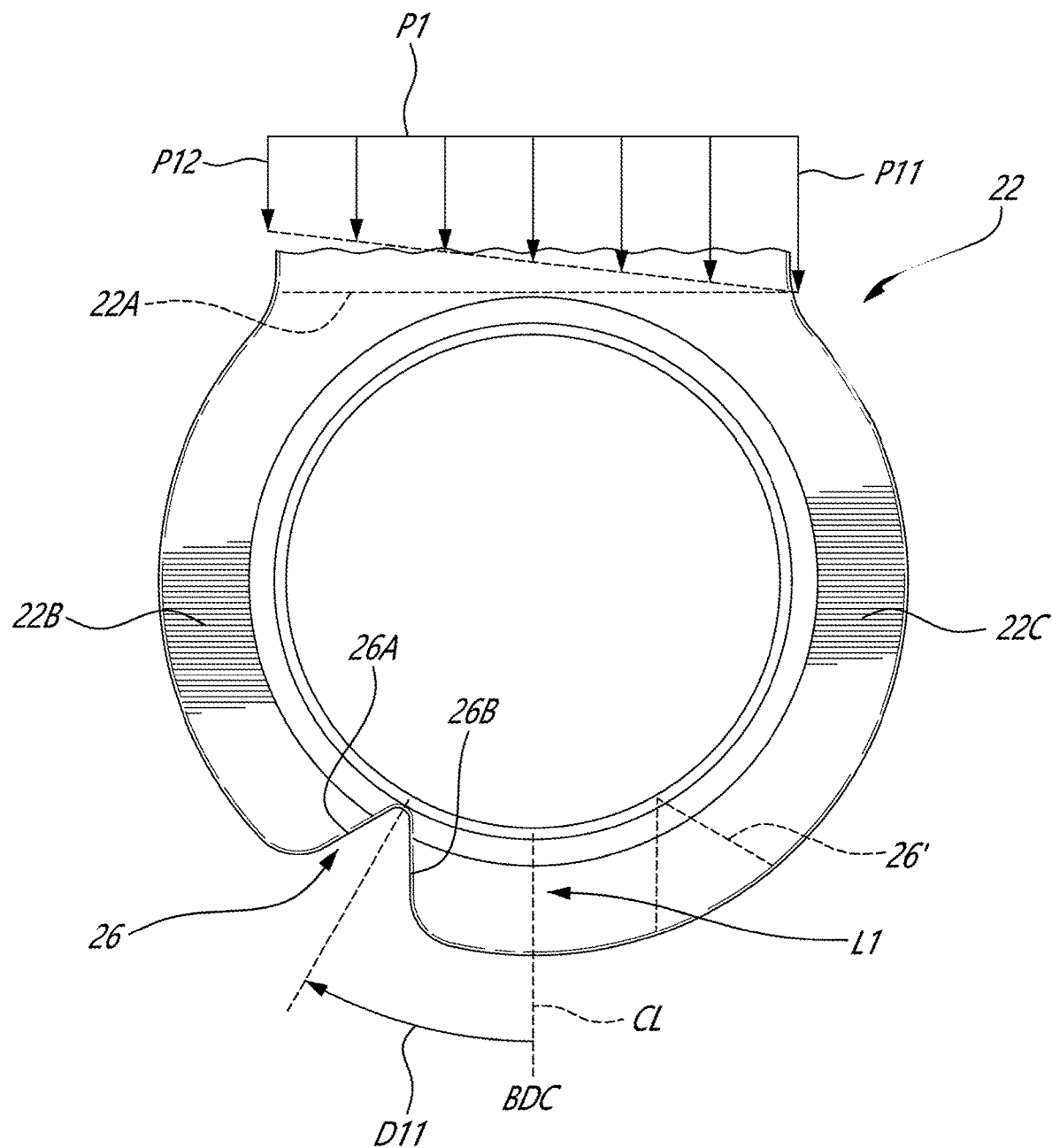
FIG. 5 is a front view of the intake of FIG. 2 shown in a first configuration.

Referring now to FIG. 5, air received from the duct 21 presents a first pressure field P1 at the duct inlet 22A of the annular inlet duct 22. In this case, the first pressure field P1 has a first pressure P11 on the right-hand side and a second pressure P12 on the left-hand side. The pressure may vary linearly between the first pressure P11 and the second pressure P12 although this need not be the case. The first pressure P11 is greater than the second pressure P12. Thus, the pressure in the second section 22C is greater than the pressure in the first section 22B. This creates a pressure differential between the opposite faces 26A, 26B of the flow restrictor 26.

The powering of the actuator 31 to move the flow restrictor 26 at 404 may include moving the flow restrictor 26 from a baseline position at the location L1 towards the first section 22B along a first circumferential direction D11, which is depicted here as a clockwise direction. The moving of the flow restrictor at 404 may include moving the flow restrictor 26 following a pressure gradient exerted on the flow restrictor 26 towards a location of lower pressure. Alternatively, the moving of the flow restrictor 26 may include moving the flow restrictor 26 against a pressure gradient towards a location of higher pressure. This alternate position of the flow restrictor 26 is shown as 26' in FIG. 5.

Figure 6:
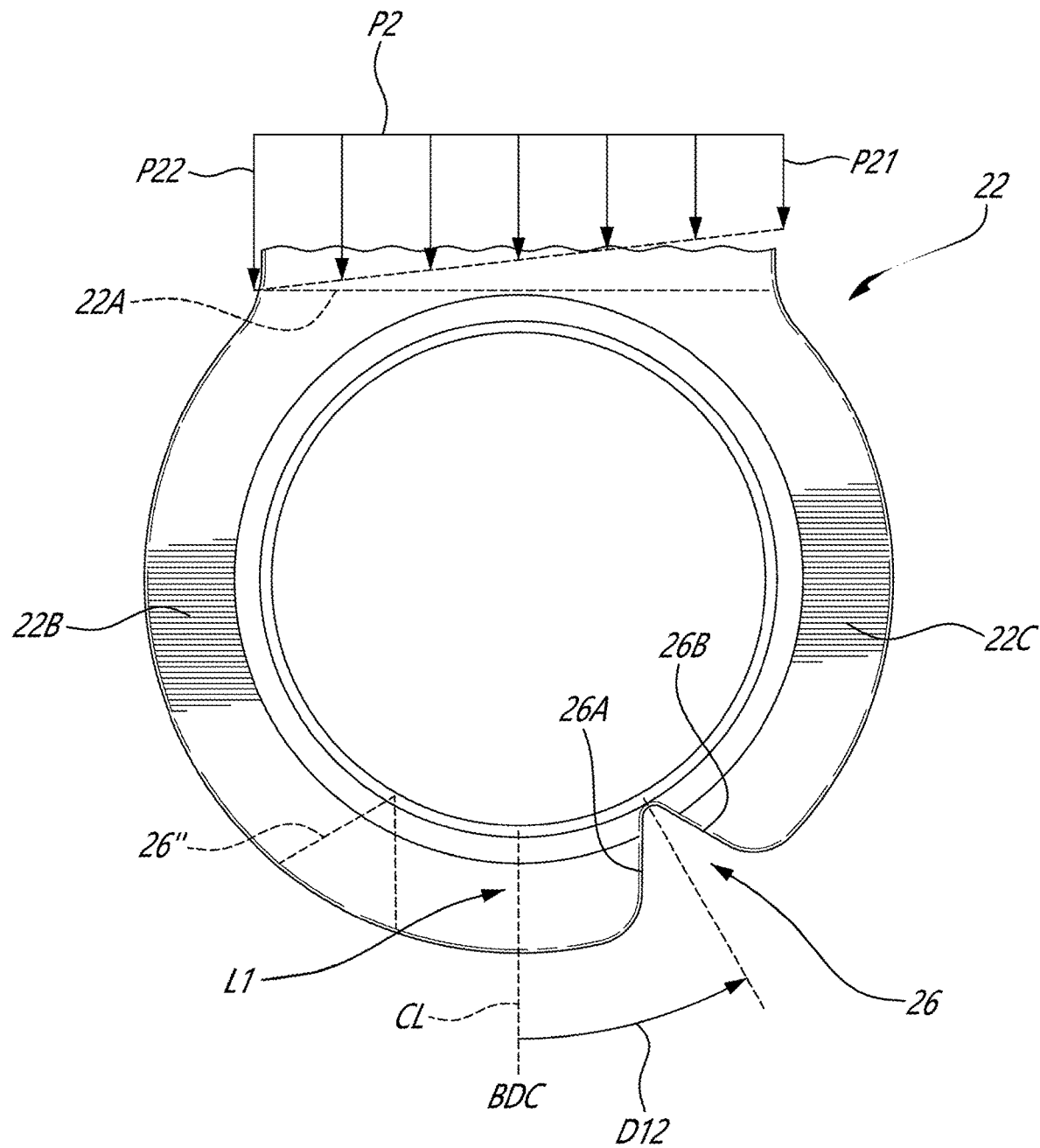
FIG. 6 is a front view of the intake of FIG. 2 shown in a second configuration.

Referring now to FIG. 6, air received from the duct 21 presents a second pressure field P2 at the duct inlet 22A of the annular inlet duct 22. In this case, the second pressure field P2 has a first pressure P21 on the right-hand side and a second pressure P22 on the left-hand side. The pressure may vary linearly between the first pressure P21 and the second pressure P12, although this need not be the case. The first pressure P21 is less than the second pressure P22. Thus, the pressure in the second section 22C is less than the pressure in the first section 22B. This creates a pressure differential between the opposite faces 26A, 26B of the flow restrictor 26.

The powering of the actuator 31 to move the flow restrictor 26 with the actuator 31 at 404 may include moving the flow restrictor 26 from a baseline position at the location L1 towards the second section 22C along a second circumferential direction D12, which is depicted here as a counter clockwise direction. The moving of the flow restrictor at 404 may include moving the flow restrictor 26 following a pressure gradient exerted on the flow restrictor 26 towards a location of lower pressure. Alternatively, the moving of the flow restrictor 26 may include moving the flow restrictor 26 against a pressure gradient towards a location of higher pressure. This alternate position of the flow restrictor 26 is shown as 26" in FIG. 6.

The variable circumferential position of the flow restrictor 26 may facilitate a reduction in inlet air pressure losses, a reduction in compressor inlet flow distortion, and/or increased compressor stall margin.

The present disclosure includes an actuation system for actively controlling movement of the ski-jump within the inlet duct. The actuation system may include one or more sensors. Based on pressure measurements from the pressure sensors, the actuation system may control the circumferential position of the ski-jump within the inlet duct to optimize performance and/or engine operability (e.g., minimize inlet distortion, maximize stall margin, etc.). The actuation system is not limited to pressure sensors and other sensors (e.g., temperature sensors) or on-board calculated parameters may be used as well. For example, the ski-jump position could also be based on other active inputs such as aircraft forward speed, opening of an inlet by-pass system, by-pass flow or actual engine operating conditions if known to be swirl sensitive at certain operating point (e.g. co-rotating vs counter-rotating swirl).

Control of the ski-jump position may be based on measured pressure differences between the right-hand and left-hand sides of the inlet duct. If air flow into the air inlet is biased to the left-hand side, the measured difference in pressure between the left-hand side and the right-hand side may cause the actuation system to move the ski-jump in the clockwise direction. If air flow into the air inlet is biased to the right-hand side, the measured difference in pressure between the right-hand side and the left-hand side may cause the actuation system to move the ski-jump in the counter-clockwise direction.

The direction of movement of the flow restrictor 26 may be selected to achieve performance/operability benefit and may depend on the objective of the flow control achieved by the flow restrictor 26.

The positioning of the flow restrictor 26 as a function of the pressure difference may be selected based on the purpose of the application based on the quantity and magnitude of the flow imbalance induced by the inlet duct 21, direction of the compressor rotation, the critical/target parameters to improve, such as the total pressure loss, compressor inlet flow distortion, or to improve stall margin. The disclosed movable flow restrictor 26 may achieve pressure loss reduction, reduction compressor inlet flow distortion or increase in stall margin by pre-swirling the flow like variable inlet guide vanes. In some embodiments, the optimum position of the flow restrictor 26 depends on the application and the desired benefit. For instance, the position may be at a first position to improve stall margin and a second position to improve efficiency.

Figure 7:
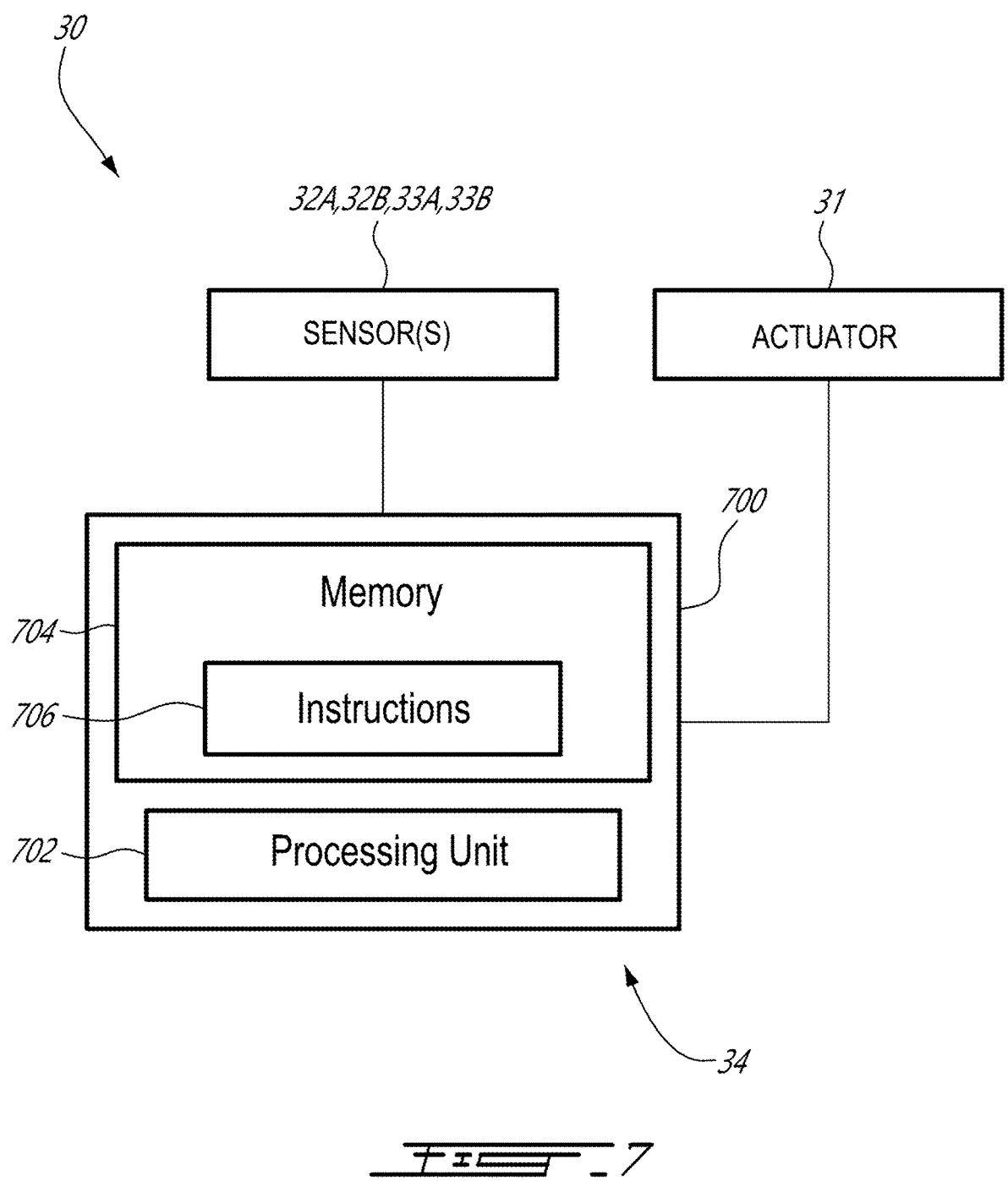
FIG. 7 is a schematic representation of a controller in accordance with one embodiment.

With reference to FIG. 7, an example of a computing device 700 is illustrated. For simplicity only one computing device 700 is shown but the system may include more computing devices 700 operable to exchange data. The computing devices 700 may be the same or different types of devices. The controller 34 may be implemented with one or more computing devices 700. Note that the controller 34 can be implemented as part of a full-authority digital engine controls (FADEC) or other similar device, including electronic engine control (EEC), engine control unit (ECU), electronic propeller control, propeller control unit, and the like. In some embodiments, the controller 34 is implemented as a Flight Data Acquisition Storage and Transmission system, such as a FAST™ system. The controller 34 may be implemented in part in the FAST™ system and in part in the EEC. Other embodiments may also apply.

The computing device 700 comprises a processing unit 702 and a memory 704 which has stored therein computer-executable instructions 706. The processing unit 702 may comprise any suitable devices configured to implement the method 400 such that instructions 706, when executed by the computing device 700 or other programmable apparatus, may cause the functions/acts/steps performed as part of the method 400 as described herein to be executed. The processing unit 702 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 704 may comprise any suitable known or other machine-readable storage medium. The memory 704 may comprise non-transitory computer readable storage medium, for example, but not limited to, an electronic, magnetic, optical, electromagnetic, infrared, or semiconductor system, apparatus, or device, or any suitable combination of the foregoing. The memory 704 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 704 may comprise any storage means (e.g., devices) suitable for retrievably storing machine-readable instructions 706 executable by processing unit 702.

The methods and systems described herein may be implemented in a high level procedural or object oriented programming or scripting language, or a combination thereof, to communicate with or assist in the operation of a computer system, for example the computing device 700. Alternatively, the methods and systems may be implemented in assembly or machine language. The language may be a compiled or interpreted language. Program code for implementing the methods and systems may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems may also be considered to be implemented by way of a non-transitory computer-readable storage medium having a computer program stored thereon. The computer program may comprise computer-readable instructions which cause a computer, or more specifically the processing unit 702 of the computing device 700, to operate in a specific and pre-defined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

In the present disclosure, the expression "about" implies variations of plus or minus 10%.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine, comprising:
   an inlet leading to a compressor section, the inlet extending circumferentially around a central axis;
   an annular inlet duct extending circumferentially around the central axis, the annular inlet duct having a duct inlet fluidly connected to an environment outside of the aircraft engine and a duct outlet fluidly connected to the inlet, the duct outlet extending circumferentially around the central axis;
   a flow restrictor located within the annular inlet duct, the flow restrictor extending across the annular inlet duct and being movable within the annular inlet duct along a circumferential direction relative to the central axis;
   an actuator engaged to the flow restrictor, the actuator operable to move the flow restrictor along the circumferential direction; and
   a controller operatively connected to at least two sensors and the actuator, the controller having a processing unit and a non-transitory computer-readable medium operatively connected to the processing unit and containing instructions executable by the processing unit for:
      receiving a signal from the at least two sensors, the signal indicative of a pressure difference between opposite sides of the flow restrictor; and
      powering the actuator to move the flow restrictor with the actuator from a first position to a second position circumferentially offset from the first position as a function of the pressure difference.

2. The aircraft engine of claim 1, wherein the receiving of the signal from the at least two sensors includes receiving the signal indicative of the pressure difference being different than zero.

3. The aircraft engine of claim 1, wherein two sensors of the at least two sensors are each operatively connected to a respective one of two sections of the annular inlet duct, the two sections opposite one another and extending from the duct inlet to the flow restrictor.

4. The aircraft engine of claim 3, wherein the two sensors are pressure sensors each operable to measure a respective pressure within the respective one of the two sections.

5. The aircraft engine of claim 3, wherein the two sensors are disposed at or proximate the duct inlet and circumferentially offset from one another.

6. The aircraft engine of claim 3, wherein the two sensors are disposed each on a respective one of the opposite sides of the flow restrictor and move with the flow restrictor.

7. The aircraft engine of claim 1, wherein the flow restrictor is movable by 45 degrees in both clockwise and counter clockwise directions from a baseline position being diametrically opposed to the duct inlet and intersecting a centerline of the annular inlet duct, the centerline intersecting the central axis.

8. The aircraft engine of claim 1, wherein the annular inlet duct includes an outer wall and two side walls extending from the outer wall, the flow restrictor located between the two side walls and movably engaged to the outer wall.

9. The aircraft engine of claim 8, wherein the flow restrictor is engaged on rails secured to the outer wall.

10. The aircraft engine of claim 1, comprising blockers secured to the annular inlet duct to limit an amplitude of movements of the flow restrictor.

11. An intake for an aircraft engine, comprising:
    an annular inlet duct extending circumferentially around a central axis, the annular inlet duct having a duct inlet for providing fluid communication with an environment and a duct outlet extending circumferentially around the central axis, the annular inlet duct defining:
       a first section extending from the duct inlet towards a location being diametrically opposed to the duct inlet, and
       a second section extending from the duct inlet towards the location, the second section opposite the first section;
    a flow restrictor located within the annular inlet duct, the flow restrictor extending across the annular inlet duct and being movable within the annular inlet duct along a circumferential direction relative to the central axis;
    an actuator engaged to the flow restrictor, the actuator operable to move the flow restriction along the circumferential direction; and
    a controller operatively connected to at least two sensors and the actuator, the controller having a processing unit and a non-transitory computer-readable medium operatively connected to the processing unit and containing instructions executable by the processing unit for:
       receiving a signal from the at least two sensors, the signal indicative of a pressure difference between a first pressure within the first section and a second pressure within the second section; and
       powering the actuator to move the flow restrictor with the actuator from a first position to a second position circumferentially offset from the first position as a function of the pressure difference.

12. The intake of claim 11, wherein the receiving of the signal from the at least two sensors includes receiving the signal indicative of the pressure difference being different than zero.

13. The intake of claim 11, wherein two sensors of the at least two sensors are each operatively connected to a respective one of the first section and the second section.

14. The intake of claim 13, wherein the two sensors are pressure sensors each operable to measure a respective pressure within the respective one of the first section and the second section.

15. The intake of claim 13, wherein the two sensors are disposed at or proximate the duct inlet and circumferentially offset from one another.

16. The intake of claim 13, wherein the two sensors are disposed each on a respective one of the opposite sides of the flow restrictor and move with the flow restrictor.

17. The intake of claim 11, wherein the flow restrictor is movable by 45 degrees in both clockwise and counter clockwise directions from a baseline position being diametrically opposed to the duct inlet and intersecting a centerline of the annular inlet duct, the centerline intersecting the central axis.

18. The intake of claim 11, wherein the annular inlet duct includes an outer wall and two side walls extending from the outer wall, the flow restrictor located between the two side walls and movably engaged to the outer wall.

19. The intake of claim 18, wherein the flow restrictor is engaged on rails secured to the outer wall.

* * * * *